April 19, 1949. I. HARTER ET AL 2,467,889

MINERAL WOOL

Filed Dec. 19, 1944 2 Sheets-Sheet 1

INVENTORS
Isaac Harter
Charles L. Norton Jr.
& Leonard D. Christie Jr.
BY
ATTORNEY April 19, 1949.  I. HARTER ET AL  2,467,889
MINERAL WOOL Filed Dec. 19, 1944  2 Sheets-Sheet 2

INVENTORS
Isaac Harter
Charles L. Norton, Jr.
& Leonard D. Christie, Jr.
BY
ATTORNEY Patented Apr. 19, 1949

2,467,889

UNITED STATES PATENT OFFICE 2,467,889

MINERAL WOOL

Isaac Harter, Akron, Ohio, Charles L. Norton, Jr., New York, N. Y., and Leonard D. Christie, Jr., Elizabeth, N. J., assignors to The Babcock & Wilcox Company, Rockleigh, N. J., a corporation of New Jersey Application December 19, 1944, Serial No. 568,890

2 Claims. (Cl. 106—50)

This invention relates in general to improved high temperature fused refractory materials, and more particularly, to mineral wool, refractory shapes and the like made of or incorporating such materials.

The materials commonly employed for the manufacture of mineral wool are natural "wool rock" (calcareous shale or argillaceous limestone), common shale, and combinations of calcareous and siliceous materials, such as metallurgical furnace slag. All such materials have a fusion point in the range of 1500–2500 F. Where the raw material has a fusion temperature in the higher portion of this range, it is customary to add varying amounts of a fluxing material, such as limestone, dolomite, fluorspar, or feldspar, to lower the fusion point of the mixture to the desired value. The usual method of manufacture is to mix the raw material or materials with coke in a vertical cupola and burn the coke therein at a combustion rate sufficient to maintain a combustion zone temperature high enough to melt the associated raw material when it reaches that section to the necessary fluidity. Cupola combustion zone temperatures of 3000 F. can be readily maintained in such apparatus over long operating periods. The molten mass flows out of the cupola at a temperature usually in the range of 2100–2600 F. in a stream which is extenuated to fiber by various methods, such as blasting the stream with high velocity air or steam to shred the molten material into fibers of various lengths.

One of the principal uses of mineral wool of the character described is for heat insulation. The upper use temperature limit for such material is determined by the temperature at which recrystallization occurs therein to an extent that embrittlement and loss of strength in the fibers result. At this temperature, known as the "devitrification" temperature, the material changes from a glassy to a crystalline structure. Tests of the best known commercial brands of mineral wool have shown none in satisfactory condition after a twenty-four hour exposure at 1350 F. due to excessive recrystallization at that temperature. The manufacturers' recommended upper use temperature limits for these mineral wools are therefore in the range of 900–1200 F.

The general object of this invention is the provision of a process of and apparatus for melting high temperature refractory materials, and more particularly alumina-silica minerals, such as fireclays, kaolins, kyanite, sillimanite and topaz, having a fusion point in the range of 2900–3350 F. A further and more specific object is the provision of a cupola construction having a relative arrangement and construction of the blast tuyères and melt outlet especially designed and particularly adapted for the melting of high temperature refractories of the character described. A further specific object is the production of a mineral wool having a devitrification temperature and an upper use temperature limit in the range of 1500–2300 F. A further specific object is the production of high temperature refractory shapes characterized by their high use temperature limits and improved volume stability.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter.

Figure 1:
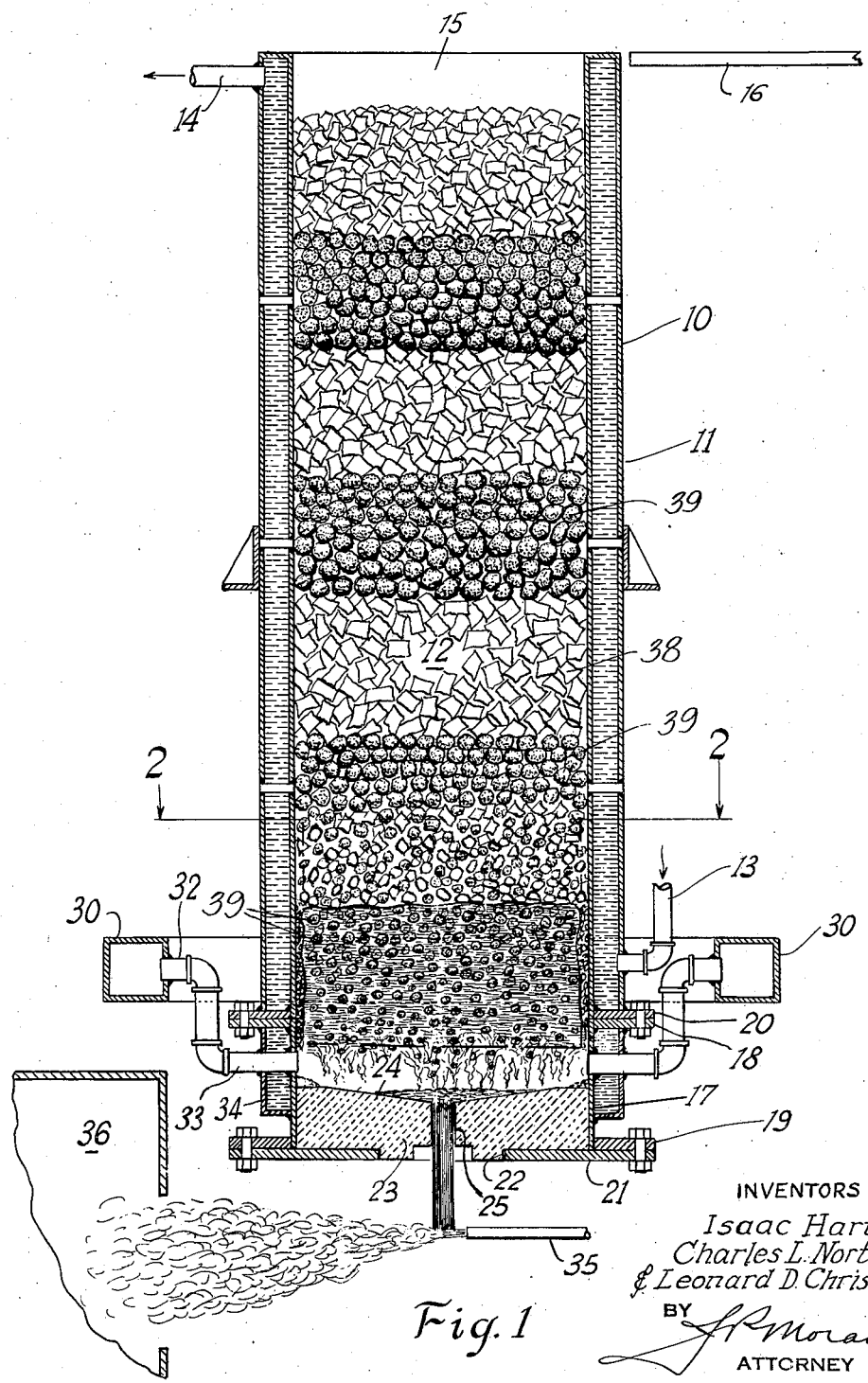
Fig. 1 is a partly diagrammatic sectional elevation of a cupola constructed in accordance with the invention, taken on the line 1—1 of Fig. 2.

In the drawings we have illustrated a cupola 10 having a vertically elongated double-walled cylindrical steel shell 11 forming a fluid cooled wall for a cylindrical chamber 12 of uniform horizontal cross-section. The outer wall of the shell has an inlet 13 adjacent its bottom and an outlet 14 adjacent its top for the circulation through the shell of a suitable cooling fluid, such as water. The cupola shell as shown is open at its upper end 15 which serves as the charging opening from a charging platform 16 and also as a gas outlet. The cupola has a bottom section consisting of a circular ring member 17 having upper and lower flanged edge portions 18 and 19 respectively. The upper flange 18 is secured to a registering bottom flange 20 on the shell 11. An annular steel plate 21 having a central opening 22 is detachably connected to the lower flange 19. The plate 21 serves as a support for a hearth 23 of suitable high temperature refractory material, such as bauxite or alumina, molded to have an upper surface 24 sloping downwardly from near the shell at a small angle to the horizontal to a central tap hole 25. The tap hole is advantageously of short vertical length and small diameter, the diameter being substantially smaller than that of the plate opening 22 to provide a substantial amount of high temperature insulating refractory surrounding the tap hole throughout its height. For example, with the chamber 12 of 30 in. diameter, the tap hole 25 should have a diameter of approximately 2 in. and a height of approximately 3 in.

We have found that the conventional location and arrangement of the cupola air blast nozzles or tuyères at a substantial distance about a bottom or side tap hole is wholly unsatisfactory for the melting of high fusion point refractory materials of the character described as any such material becoming molten in the high temperature section of the chamber 12 will become solidified long before it can reach the tap hole. In accordance with this invention, an oxygen-containing gas, such as air, is supplied to the charge of coke and refractory material in the chamber 12 from an annular wind box 30 surrounding the shell 11 and having a tangential supply connection 31 from a blower (not shown) or other suitable source of air under pressure. The wind box is connected by pipe fittings 32 to a circular series of tuyères 33 opening through the bottom ring member 17 at angularly spaced points. Each of the eight tuyères 33 illustrated is arranged with its axis substantially tangential to a circle approximately half the diameter of the chamber 12 and discharging in a counter-clockwise direction immediately above the upper surface 24 of the hearth. By way of example, a tuyère center line level 2-3 in. above the furnace bottom has been found satisfactory. The discharge ends of the tuyères are advantageously protected by a water jacket 34.

In the preferred mode of operation, a bed of egg-size metallurgical coke about 26-30 in. high is ignited on the hearth and allowed to burn until the bed is at a desired high temperature. The cupola is then charged through the top opening 15 with alternate layers of the high fusing point refractory material 38 to be melted and additional coke 39 in a ratio of refractory material to coke of approximately 1.5:1 by weight. The material to be melted is advantageously supplied in the form of pieces of grog or clinker made by calcining the raw material in a rotary furnace to eliminate the water of combination. Kaolins or China clay are preferred for the raw refractory material because of their relatively high purity, firing to a white color, and availability at relatively low cost. Kaolins have a fusion point of about 3245 F. and one Georgia kaolin, for example, has a chemical analysis of approximately

| | Per cent |
|---|---|
| Silica | 45.30 |
| Alumina | 39.14 |
| Titanium oxide | 1.54 |
| Iron oxide | 0.27 |
| Lime | 0.13 |
| Magnesia | 0.04 |
| Potash | 0.15 |
| Soda | 0.10 |
| Ignition loss | 13.71 |

Figure 2:
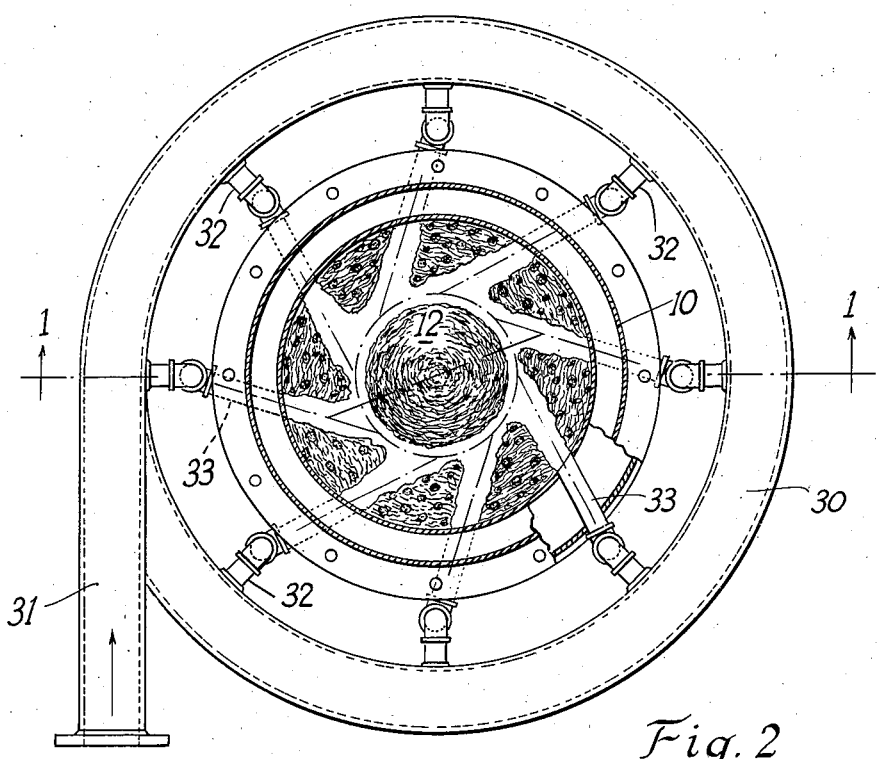
Fig. 2 is a horizontal section partly broken away taken on the line 2—2 of Fig. 1.

The raw kaolin is heated in a rotary to about 3100 F. and the resulting grog used in the cupola without the addition of a fluxing material, thus avoiding any reduction in its fusion temperature. The charge is roasted for a short period to raise its temperature and the air blast then turned on through the tuyères 33 at a predetermined rate. The temperature in the high temperature combustion zone which with the described construction is immediately above the hearth substantially increases under the air blast operation to a value (e. g. 3500 F.) above the fusion point of the material to be melted. The combustion gases and any unconsumed air flow upwardly through the charge in the cupola contacting with the alternate grog and coke layers, thus imparting sensible heat to both the grog and coke before those materials reach the combustion zone. As the coke in the bottom layer is consumed and the grog melted, the remaining part of the charge descends by gravity. The charge may be periodically compressed mechanically to maintain a compact formation and prevent bridging in the cupola. The grog melted in the combustion zone trickles down over the burning coke therein to the tap hole 25. Additional alternate layers of grog and coke are supplied as required to maintain the level of the charge in the cupola. The relative arrangement and construction of the tuyères and tap hole maintain the zone of greatest melt fluidity close to the tap hole to avoid chilling of the melt before its discharge. Substantially all of the grog will be melted by the time it reaches a level twelve inches above the tuyère level. The proportion of melted or fused kaolin to coke above the twelve inch level rapidly decreases. While a relatively large number of tuyères is used to reduce the velocity of the air blast, the velocity is still sufficient to form air channels through the mass of fused kaolin and coke at the tuyère level, as indicated in Fig. 2, symmetrically arranged relative to the pool of fused kaolin above and around the tap hole. While the melted kaolin is sufficiently fluid to be shredded by a blow pipe blast into fine fibers, its fluidity and rate of discharge are still substantially less than when wool rock is melted in the same apparatus due to the substantial difference in their fusion temperatures.

The melted or fused kaolin discharging from the tap hole 25 can be advantageously utilized for the manufacture of various refractory products. It has proved to be particularly advantageous when made into a high temperature mineral wool, such as by the use of a blow pipe 35 below the tap hole discharging a stream of high velocity steam or air across the falling stream of molten material in the usual manner to shred the melt into fibers or various lengths and deposit the fibers produced in a collecting chamber 36. While melted kaolin when slowly cooled forms a mullite-silica glass aggregate, when very rapidly quenched in air or water it will form a transparent or translucent non-crystalline glass. The fused kaolin fibers collected in the collecting chamber 36 were found to have the following chemical analysis:

| | Per cent |
|---|---|
| $Al_2O_3$ | 45.24 |
| $SiO_2$ | 51.00 |
| $Fe_2O_3$ | 1.06 |
| $TiO_2$ | 2.17 |
| Combined C | 0.14 |
| CaO+MgO (estimated) | 0.25 |
| Ignition loss | 0.20 |

This high alumina content is particularly advantageous, as a high alumina content mineral wool is known to be a better insulator under humid conditions, due to its lesser tendency to pick up moisture from the air. High alumina glasses tend to resist heat, devitrification, and chemical attack better than conventional glasses.

The majority of the fused kaolin fibers produced were found to have a diameter of 1-6 microns, while a few have a diameter of 10-15 microns and above. The specific gravity of the fibers was approximately 2.62. The index of refraction was found to be between 1.550 and 1.545. Samples of the fused kaolin wool were reheated to various temperatures up to 3300 F. No crystallization occurred below 2600 F. At temperatures between 2350 F. and 2600 F. some change in the material took place as the heavier fibers became visible under crossed Nicol prisms, but no recrystallization was noted. A well defined recrystallization occurred during heating at 2600 F., but the crystals were too small to identify. Melting took place when the fibers were heated at 3300 F. and large amounts of large mullite crystals were present. The fibers were given bending tests and found to retain their good resiliency after heating at temperatures as high as 2400 F. for five hours. The presence of large amounts of mullite crystals at a melting temperature and the devitrification temperature noted prove that the fibers are substantially pure chilled kaolin. With the described properties these fibers can be safely used at temperatures ranging upwards to 2350 F. as thermal, sound and electrical insulation, high temperature gas filters, and like purposes.

Figure 3:
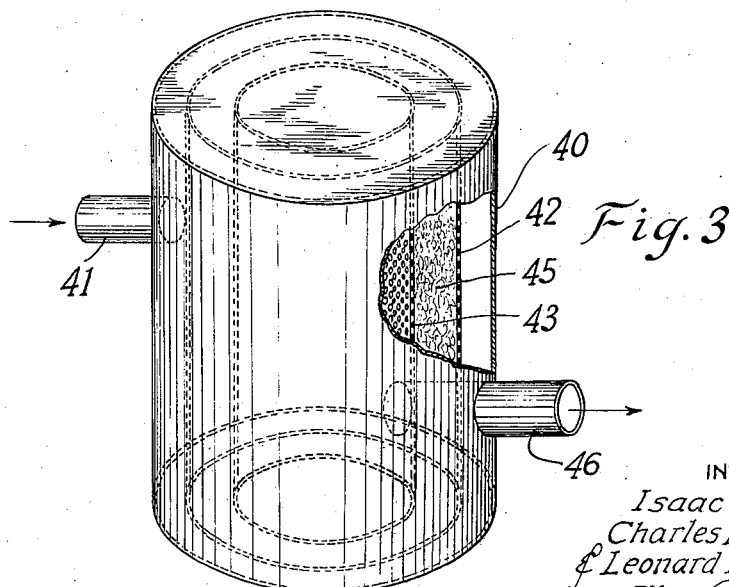
Fig. 3 is a perspective view partly broken away of a gas filter adapted for high temperature use.

Mineral wools of the character described are particularly suitable for use as a filtering material for high temperature gases, such as in the exhaust line of a Diesel engine or the gas inlet line of a gas turbine. In Fig. 3 we have illustrated a gas filter suitable for separating out catalyst dust from hydrocarbon vapors leaving a catalyst chamber in the Houdry process. The filter is formed by a cylindrical casing 40 of heat resisting alloy closed at both ends and having an inlet connection 41 for dust-laden high temperature gases. A replaceable filter unit is formed by spaced foraminous cylindrical members 42 and 43 of similar alloy between which is positioned an anular layer 45 of the described fused kaolin wool. A gas outlet pipe 46 opens into the space within the inner screen member 43. With this construction the dust-laden gases will pass through the mineral wool layer throughout its circumference, depositing the suspended dust in the fibrous mass. The high devitrification temperature of the mineral wool enables it to safely withstand gas temperatures of 2000 F. indefinitely.

The melted kaloin produced as described can also be advantageously used as grog or aggregate for molded refractory shapes. For this purpose the melt is solidified, such as by water quenching or casting into billets, and the resulting grog crushed to pass through a 4-mesh screen. The grog is then mixed with brick clay and water in the approximate proportions:

4 mesh cupola grog_____ 67% by weight
Brick clay_____ 33% by weight
Water _____ 9% by weight of solids The batch is molded into 9 inch straights, and the straights dried at 220 F. and fired to 3023 F. On reheating specimens for five hours at 2912 F., the reheat shrinkage varied from plus 0.15–minus 0.19% volume, showing a substantially stable condition. These bricks were found to be superior to bricks of similar composition made with the usual rotary grog calcined to a temperature below the fusion point of the material, by having 10% less weight per straight, one-third the linear shrinkage, and two-fifths the volumetric shrinkage.

The improved properties of brick incorporating the described cupola grog are believed to be due to the presence of a small but effective amount of carbon which appears to be partly in solution and partly in suspension in the grog. While the inclusion of a small amount of carbon in the melt discharged through the tap hole does not appear to change the physical properties of the resulting fiber when the stream is disintegrated, the presence of carbon in solution or in suspension in the melt has been found to be highly important when the melt is solidified and the crushed pieces used as brick grog. The carbon content of the grog is preferably in the range of 0.05–1.00% by weight of the grog. As compared to similarly fired brick made with similar percentages of rotary grog or even pure fused kaolin grog, brick containing the kaolin-carbon grog was found to have a substantially less volume shrinkage.

We claim:

1. As a new material, resilient mineral wool fibers consisting of substantially pure non-crystalline fused kaolin and having a fusion temperature in the range of 2900–3350 F. and a devitrification temperature above 2000 F.

2. As a new material, resilient mineral wool fibers consisting of substantially pure non-crystalline fused kaolin and having a fusion temperature in the range of 2900–3350 F., a devitrification temperature above 2000 F., and containing from .05–1.00% carbon by weight.

ISAAC HARTER.
CHARLES L. NORTON, Jr.
LEONARD D. CHRISTIE, Jr.

REFERENCES CITED

The following references are of record in the file of this patent:

UNITED STATES PATENTS

| Number | Name | Date |
|---|---|---|
| 313,102 | Peckham | Mar. 3, 1885 |
| 906,173 | Tone | Dec. 8, 1908 |
| 906,339 | Tone | Dec. 8, 1908 |
| 1,521,577 | Wittemeier | Dec. 30, 1924 |
| 1,589,803 | Haring | June 22, 1926 |
| 1,944,856 | Willetts | Jan. 23, 1934 |
| 2,021,221 | Benner et al. | Nov. 19, 1935 |
| 2,063,219 | Arnold | Dec. 8, 1936 |
| 2,202,090 | Colbert | May 28, 1940 |
| 2,215,887 | Seigle | Sept. 24, 1940 |
| 2,300,930 | Johnson | Nov. 3, 1942 |